US009172301B2

(12) United States Patent
Nguyen

(10) Patent No.: US 9,172,301 B2
(45) Date of Patent: Oct. 27, 2015

(54) SYNCHRONOUS RECTIFICATION IN THE THREE-LEVEL INVERTER-CONVERTER TOPOLOGIES

(71) Applicant: Hamilton Sundstrand Corporation, Charlotte, NC (US)

(72) Inventor: Vietson M. Nguyen, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 278 days.

(21) Appl. No.: 13/888,935

(22) Filed: May 7, 2013

(65) Prior Publication Data

US 2014/0334208 A1    Nov. 13, 2014

(51) Int. Cl.
*H02M 7/217* (2006.01)
*H02M 3/155* (2006.01)
*H02M 7/487* (2007.01)
*H02M 7/5387* (2007.01)

(52) U.S. Cl.
CPC .............. *H02M 3/155* (2013.01); *H02M 7/217* (2013.01); *H02M 7/487* (2013.01); *H02M 7/5387* (2013.01); *Y02B 70/1483* (2013.01)

(58) Field of Classification Search
CPC .............................. H02M 3/155; H02M 7/217
USPC .................................... 363/21.06, 21.14, 127
See application file for complete search history.

(56) References Cited

U.S. PATENT DOCUMENTS

| | | | |
|---|---|---|---|
| 6,188,592 B1 * | 2/2001 | Farrington et al. | 363/98 |
| 6,256,214 B1 * | 7/2001 | Farrington et al. | 363/127 |
| 6,370,044 B1 * | 4/2002 | Zhang et al. | 363/21.06 |
| 7,193,866 B1 * | 3/2007 | Huang | 363/22 |
| 7,375,988 B2 * | 5/2008 | Hensel | 363/21.06 |
| 2011/0013438 A1 | 1/2011 | Frisch et al. | |

FOREIGN PATENT DOCUMENTS

| | | |
|---|---|---|
| AU | 2012203064 A1 | 12/2012 |
| EP | 2237402 A1 | 10/2010 |
| WO | WO-2012056766 A1 | 5/2012 |

OTHER PUBLICATIONS

Schweizer M et al: "Comparison and implementation of a 3-level NPC voltage link back-to-back converter with SiC and Si diodes", Applied Power Electronics Conference and Exposition (APEC), 2010 Twenty-Fifth Annual IEEE, IEEE, Piscataway, NJ, USA, Feb. 21, 2010, pp. 1527-1533, XP031649634, ISBN: 978-1-4244-4782-4.
Search Report and Opinion issued by the European Patent Office on Aug. 7, 2015 for European Patent Application No. 14167387.

* cited by examiner

*Primary Examiner* — Matthew Nguyen
(74) *Attorney, Agent, or Firm* — Locke Lord LLP; Scott D. Wofsy; Christopher J. Cillié

(57) ABSTRACT

A power module is disclosed having a first module block defining a first rectifier and including a first rectifier switch having a first FET and connected in parallel with a first diode, a second module block including a second FET connected in parallel with a second diode, a third module block including a third FET connected in parallel with a third diode, wherein the second and third module blocks are positioned between first and second terminal interfaces of the power module, and wherein two serially connected diodes are on the first interface side of the power module in parallel with the serially connected second and third module blocks, and a fourth module block defining a second rectifier and including a second rectifier switch having a fourth FET and connected in parallel with a fourth diode.

16 Claims, 3 Drawing Sheets

SYNCHRONOUS RECTIFICATION IN THE THREE-LEVEL INVERTER-CONVERTER TOPOLOGIES

BACKGROUND OF THE INVENTION

1. Field of the Invention

The subject invention relates to three level power inverter/converter topologies, and more particularly, to the application of synchronous rectification in a uni-directional active rectifier circuit to reduce static losses by lowering the voltage drop across the circuit utilizing power semiconductor devices.

2. Description of Related Art

Synchronous rectification is a concept that has been applied in the past, particularly in DC-DC converters at low output voltage levels. In those converters where conventional circuit topologies were utilized, a voltage drop of 0.4 V to about 1.0 V in the output rectifier is common and would be converted into a significant loss, since the output voltage of a typical DC-DC power converter is usually only about 1.0 or 2.0 V.

Synchronous rectification involves the use of a power FET connected in parallel with a diode, wherein the FET is configured to be turned on when the diode is conducting, so that current flow is re-directed through the FET. Since the FET operates with lower resistance than the diode, the voltage drop across the circuit will be lower and more efficient.

Given the efficiencies associated with synchronous rectification, it would be beneficial to apply this principle to a full power circuit of a uni-directional active rectifier, also known as a Vienna Rectifier, in order to reduce the static losses across the circuit. This would be particularly advantageous in power inverter/converter topologies employed in aerospace applications, where switching speed and efficiency are sought after.

SUMMARY OF THE INVENTION

The subject invention is directed to a new and useful power module, such as a three-level inverter/converter, employing synchronous rectification to reduce static losses and enhance efficiency.

The power module includes a first synchronous rectifier switch (containing a first FET) that communicates with a positive DC terminal of the power module. The first synchronous rectifier switch is connected in parallel with a first diode. Together, the first synchronous rectifier switch and the first diode form a first module block, which comprises a first synchronous rectifier of the power module.

The power module further includes a second power FET connected in parallel with a second diode to form a second module block, and a third power FET is connected in parallel with a third diode to form a third module block.

The second and third module blocks are positioned between first and second terminal interfaces (IO1 and IO2) of the power module, and two serially connected diodes are utilized on the first (IO1) terminal interface side of the power module in parallel with the serially connected second and third module blocks.

A second synchronous rectifier switch (containing a fourth FET) communicates with a second (IO2) terminal of the power module. The switch is connected in parallel with a fourth diode to form a fourth module block. Together, the second synchronous rectifier switch and the fourth diode form a fourth module block, which comprises a second synchronous rectifier of the power module.

In another embodiment of the subject invention, a synchronous rectifier is also connected in parallel with each of the serially connected diodes on the first (IO1) terminal interface side of the power module.

Preferably, each synchronous rectifier switch comprises a silicon carbide (SiC) power MOSFET connected in parallel with an internal inherent power diode. Preferably, each diode that is connected in parallel with a synchronous rectifier is a silicon carbide (SiC) Shottky diode.

In accordance with the subject invention, the power module further includes a current sensor for sensing current flowing through the first diode and the fourth diode. More preferably, the power module includes a current sensor located in the circuit for sensing current flowing through the parallel connected first synchronous rectifier switch and first diode (i.e., the first module block), and for sensing current flowing through the parallel connected fourth synchronous rectifier switch and fourth diode (i.e., the fourth module block). Preferably, control logic is provided to control the operation of the synchronous rectifiers of the power module.

In accordance with a preferred embodiment of the subject invention, the first and second synchronous rectifiers (i.e., the first and fourth module blocks) are configured so that they are not turned on while the second and third power FETs are turned on. In addition, the second and third power FETs are configured to be turned on simultaneously.

The first and second synchronous rectifiers (i.e., the first and fourth module blocks) are configured so that they are turned on at different times. More particularly, the first and second synchronous rectifiers (i.e., the first and fourth module blocks) are configured so that they are turned on at different parts of two half-cycles.

The first synchronous rectifier switch is configured so that it is turned on only after the first diode has conducted current and then turned off before the current through the first diode has completely stopped. Moreover, the first synchronous rectifier switch is configured so that it is not turned on as the same time as the second and thirds power FETs are turned on, to prevent a shoot-through condition.

Similarly, the second synchronous rectifier switch is configured so that it is turned on only after the fourth diode has conducted current and then turned off before the current through the fourth diode has completely stopped. Moreover, the second synchronous rectifier switch is configured so that it is not turned on at the same time as the second and third power FETs are turned on, to prevent a shoot-through condition.

These and other features of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the subject invention without undue experimentation, preferred embodiments thereof will be described in detail herein below with reference to certain figures, wherein.

DETAILED DESCRIPTION OF PREFERRED EMBODIMENTS

Figure 1:
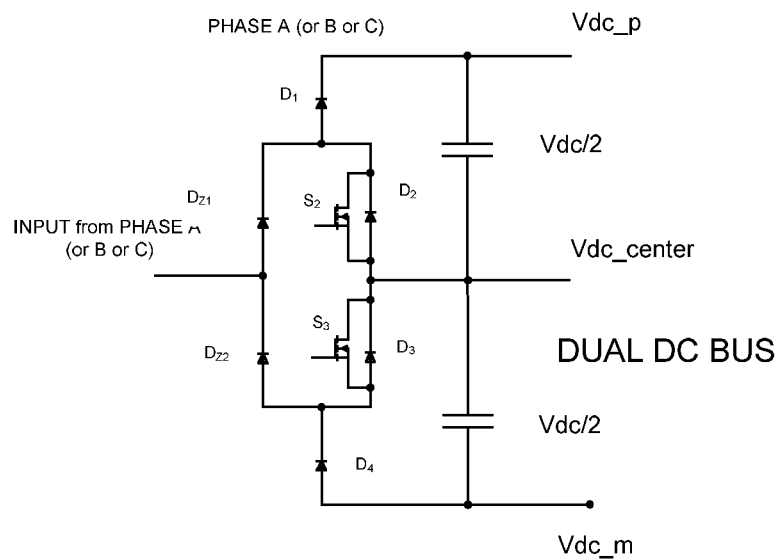
FIG. 1 is a schematic rendering of a prior art Vienna-type active rectifier.

Referring now to the drawings, wherein like reference numerals identify similar structural features or aspects of the subject invention, there is illustrated in FIG. 1 a schematic representation of a prior art uni-directional Vienna-type active rectifier, which serves as precursor topology for the power module of the subject invention. As illustrated, a prior art Vienna-type active rectifier includes two power MOSFET devices at the center of the circuit.

Figure 2:
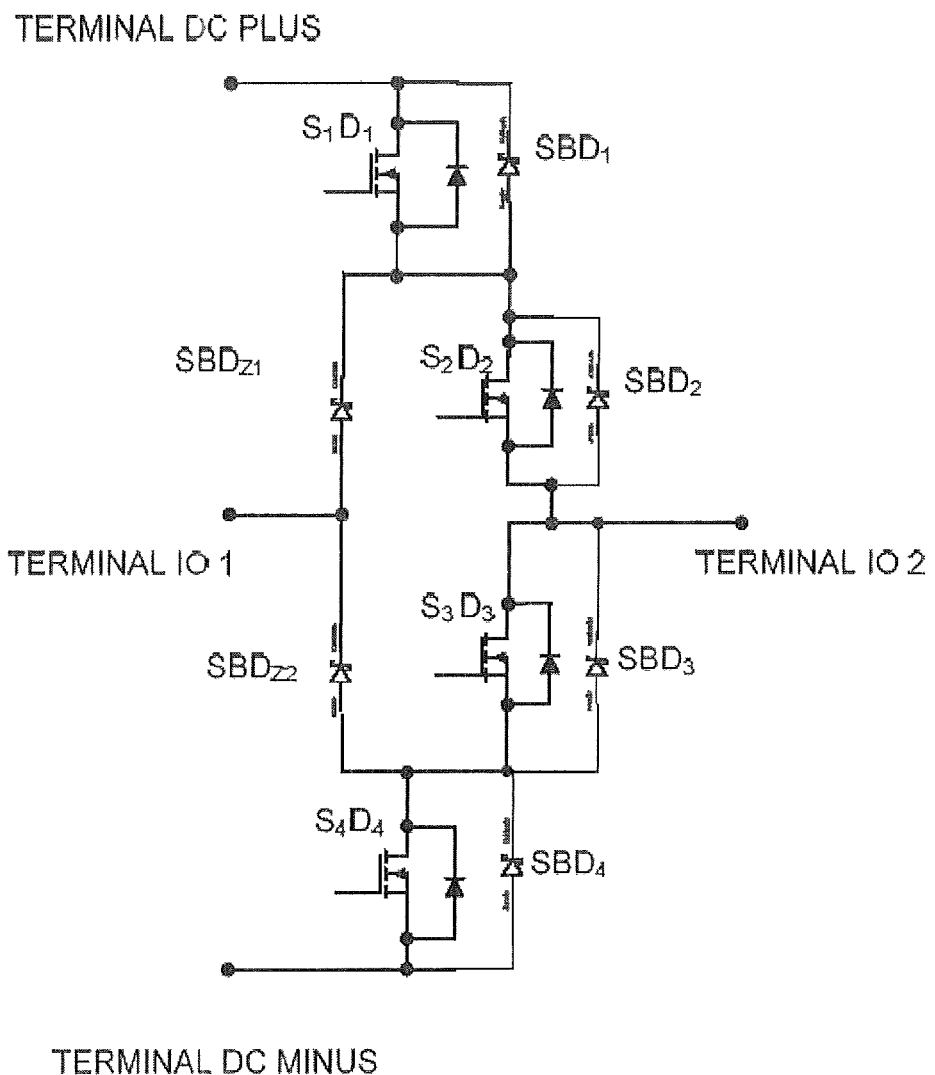
FIG. 2 is a schematic rendering of a power module employing synchronous rectification, which is constructed in accordance with a preferred embodiment of the subject invention.

An exemplary embodiment of a power module constructed in accordance with a preferred embodiment of the subject invention is illustrated in FIG. 2. The power module of FIG. 2 is configured as part of a three-level power inverter/converter and is adapted for use in a unidirectional active rectifier mode.

As discussed in more detail herein below, the power module of the subject invention employs a plurality of synchronous rectifiers each consisting of a silicon carbide (SiC) power MOSFET connected in parallel with a SiC Schottky power diode. As used herein, the terms FET and MOSFET should not be construed in a manner so as to limit the subject disclosure in any way. Rather, it should be understood by those skilled in the art that the circuits shown and described herein could be constructed and applied with other types of power FET devices known in the art, including, for example, JFET devices, DMOSFET devices and CoolMOS devices.

Referring now to FIG. 2, the power module includes a first synchronous rectifier switch $S_1D_1$ that communicates with a first terminal of the power module. Here, the first terminal of the module is a positive DC terminal. The first synchronous rectifier switch $S_1D_1$ is connected in parallel with a first reverse-parallel SiC Schottky diode $SBD_1$ to form the first synchronous rectifier block. The power module further includes a second power FET $S_2D_2$ that is connected in parallel with a second reverse-parallel SiC Schottky diode $SBD_2$, and a third power FET $S_3D_3$ that is connected in parallel with a third SiC Shottky diode $SBD_3$.

The second and third power FETs $S_2D_2$ and $S_3D_3$ are positioned between first and second terminal interfaces IO 1 and IO 2 of the power module. Two serially connected fast switching Schottky diodes $SBD_{Z1}$ and $SBD_{Z2}$ are utilized on the first terminal interface side IO 1 of the power module connected in parallel with the serially connected second and third power FETs $S_2D_2$ and $S_3D_3$.

The power module of FIG. 2 further includes a second synchronous rectifier switch $S_4D_4$ that connects with a second terminal of the power module. Here the second terminal of the power module is a negative DC terminal. The second synchronous rectifier switch $S_4D_4$ is connected in parallel with a fourth diode $SBD_4$ which is a reverse-parallel SiC Schottky diode, forming a second synchronous rectifier block.

In accordance with a preferred embodiment of the subject invention, the first and second synchronous rectifier switches $S_1D_1$ and $S_4D_4$ are configured so that they are not turned on while the second and third power FETs $S_2D_2$ and $S_3D_3$ are turned on. In addition, the second and third power FETs $S_2D_2$ and $S_3D_3$ are configured to be turned on simultaneously.

Immediately after the second and third power FETs $S_2D_2$ and $S_3D_3$ are turned off, the SiC Schottky diode $SBD_1$ is turned on "naturally" (since it is forward-biased). Once it is confirmed that $SBD_1$ is turned on and after a short dead-time delay, the first synchronous rectifier switch $S_1D_1$ can be turned on, lowering the voltage across the SiC Schottky diode $SBD_1$ significantly.

With continuing reference to FIG. 2, the first and second synchronous rectifiers switches $S_1D_1$ and $S_4D_4$ are configured so that they are turned on at different times. More particularly, the first and second synchronous rectifier switches $S_1D_1$ and $S_4D_4$ are configured so that they are turned on at different parts of two half-cycles. Since these synchronous rectifiers effectively operate like low resistance components, the voltage drop in the SiC Schottky diodes $SBD_1$ and $SBD_4$ is controllably reduced. Furthermore, forward diode voltage will decrease in portion to the die size of the FET used in the rectification.

The first synchronous rectifier switch $S_1D_1$ is configured so that it is turned on only after the first diode $SBD_1$ has conducted current and then turned off before the current through the first diode $SBD_1$ has completely stopped. Moreover, the first synchronous rectifier switch $S_1D_1$ is configured so that it is turned on not at the same time when the second and third power FETs $S_2D_2$ and $S_3D_3$ are turned on to prevent a shoot-through condition.

Similarly, the second synchronous rectifier switch $S_4D_4$ is configured so that it is turned on only after the fourth diode $SBD_4$ has conducted current and then turned off before the current through the fourth diode $SBD_4$ has completely stopped. Moreover, the second synchronous rectifier switch $S_4D_4$ is configured so that it is turned on not at the same time when the second and third power FETs $S_2D_2$ and $S_3D_3$ rectifiers are turned on to prevent a shoot-through condition.

Since the first and second synchronous rectifier switches $S_1D_1$ and $S_4D_4$ are turned on to emulate a diode operation, neither switch should be allowed to carry a reverse current, therefore the current flowing through the first synchronous rectifier block comprised of $S_1D_1$ and diode $SBD_1$ must be sensed at some locations in the circuit. A similar current sensing step must be done to prevent the reverse current flowing through the second synchronous rectifier block consisting of $S_4D_4$ and diode $SBD_4$.

In order to accomplish this and to make sure that the conditions noted above are satisfied, the power module of FIG. 2 further includes means for sensing current flowing through the first Schottky diode $SBD_1$ and the second Schottky diode $SBD_4$. More preferably, the power module includes means for sensing current flowing through the parallel connected first synchronous rectifier switch $S_1D_1$ and first Schottky diode $SBD_1$, and for sensing current flowing through the parallel connected second synchronous rectifier switch $S_4D_4$ and second Schottky diode $SBD_4$.

Preferably, control logic is provided to control the operation of the synchronous rectifiers of the power module shown in FIG. 2. More particularly, control logic is employed to turn the synchronous rectification on and off during the operation of the power module.

Figure 3:
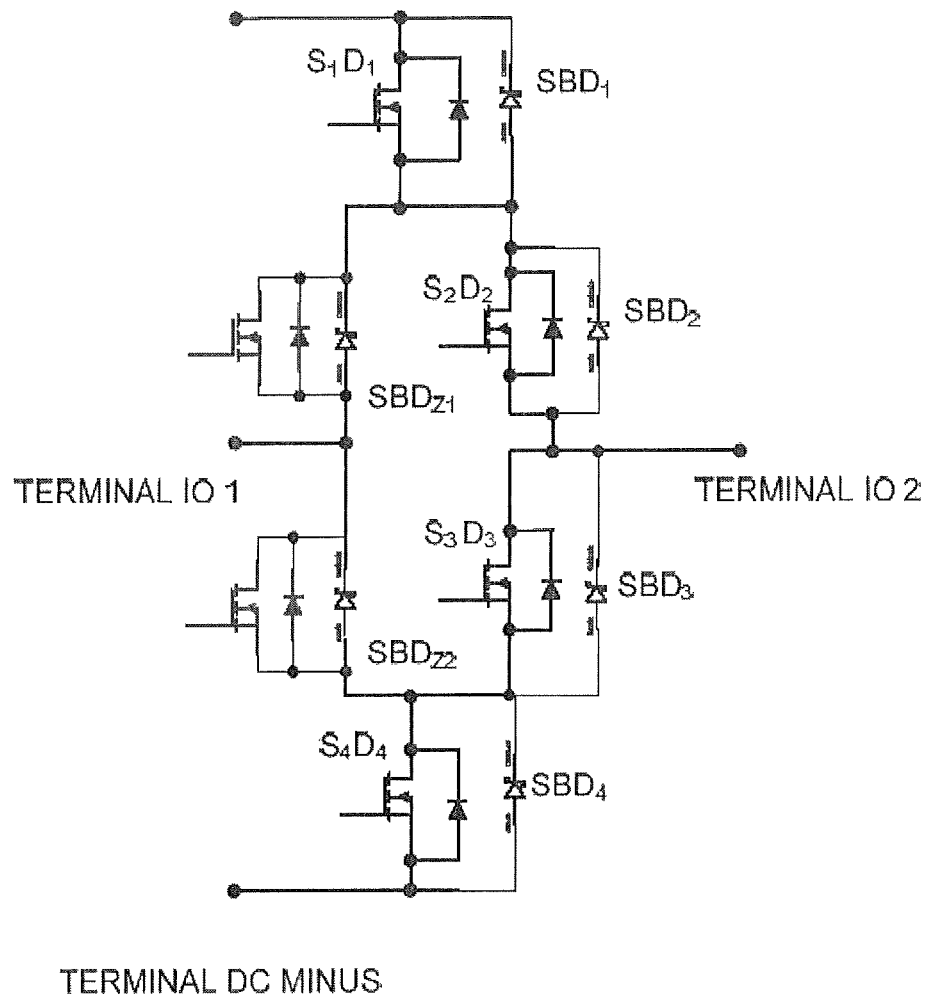
FIG. 3 is a schematic rendering of another embodiment of a power module employing synchronous rectification, in accordance with the principles of the subject invention.

Referring to FIG. 3, there is shown another power module constructed in accordance with a preferred embodiment of the subject invention. In this embodiment of the subject invention, a synchronous rectifier is also connected in parallel with each of the serially connected diodes $SBD_{Z1}$ and $SBD_{Z2}$ on the first terminal interface side of the power module. A similar switching logic to that employed with the power module described with respect to FIG. 1 could also be applied and this topology, for both the three-level inverter and converter.

Those skilled in the art will readily appreciate that the silicon carbide (SiC) Schottky diodes utilized in the power module of the subject invention, have a much lower reverse recovery current than silicon fast recovery diodes, and a higher reverse voltage, thus the SiC Schottky diode is very fast at the turn-on and turn-off times. However, once conducted, the forward voltage drop through the SIC Schottky diode is relatively high (up to 1.7 V max) as compared to the voltage drop of a large die-size SiC power MOSFET. These characteristics would make the synchronous rectifier (as a combination of a SiC MOSFET and SiC Schottky diode), a good rectification device for high frequency and high power operation (fast turn-on, turn-off and low conduction drop, translates to high efficiency at a high operating frequency).

It should also be appreciated that silicon carbide has a high thermal conductivity, and temperature has little influence on its switching and thermal characteristics. With special packaging, silicon carbide Schottky diodes can operate at junction temperatures of over 500 K (about 200° C.), which allows passive radiative cooling in aerospace applications such as those disclosed herein.

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A power module comprising:
   a) a first module block defining a first synchronous rectifier and including a first synchronous rectifier switch having a first power FET and connected in parallel with a first diode;
   b) a second module block including a second power FET connected in parallel with a second diode;
   c) a third module block including a third power FET connected in parallel with a third diode, wherein the second and third module blocks are positioned between first and second terminal interfaces of the power module, and wherein two serially connected diodes are utilized on the first terminal interface side of the power module in parallel with the serially connected second and third module blocks; and
   d) a fourth module block defining a second synchronous rectifier and including a second synchronous rectifier switch having a fourth power FET and connected in parallel with a fourth diode;
   wherein each synchronous rectifier comprises a silicon carbide (SiC) power MOSFET connected in parallel with a power diode, the power diode being a silicon carbide (SiC) Shottky diode.

2. A power module as recited in claim 1, wherein the two serially connected diodes on the first terminal interface side of the power module are silicon carbide (SiC) Shottky diodes.

3. A power module as recited in claim 1, wherein the first synchronous rectifier communicates with a positive terminal of the power module.

4. A power module as recited in claim 1, wherein the second synchronous rectifier communicates with a negative terminal of the power module.

5. A power module as recited in claim 1, further comprising a sensor for sensing current flowing through the first diode and the fourth diode.

6. A power module as recited in claim 1, further comprising a sensor for sensing current flowing through the first synchronous rectifier and the second synchronous rectifier.

7. A power module as recited in claim 1, wherein a synchronous rectifier switch is connected in parallel with each of the serially connected diodes on the first terminal interface side of the power module.

8. A power module as recited in claim 1, wherein the first and second synchronous rectifiers are configured so that they are not turned on while the second and third power FETs are turned on.

9. A power module as recited in claim 1, wherein the second and third power FETs are configured to be turned on simultaneously.

10. A power module as recited in claim 1, wherein the first and second synchronous rectifiers are configured so that they are turned on at different times.

11. A power module as recited in claim 10, wherein the first and second synchronous rectifiers are configured so that they are turned on at different parts of two half-cycles.

12. A power module as recited in claim 1, wherein the first synchronous rectifier switch is configured so that it is turned on only after the first diode has conducted current and then turned off before the current through the first diode has completely stopped.

13. A power module as recited in claim 12, wherein the first synchronous rectifier is configured so that it is not turned on at the same time as the second and third power FETs are turned on to prevent a shoot-through condition.

14. A power module as recited in claim 1, wherein the second synchronous rectifier switch is configured so that it is turned on only after the fourth diode has conducted current and then turned off before the current through the fourth diode has completely stopped.

15. A power module as recited in claim 14, wherein the second synchronous rectifier is configured so that it is not turned on at the same time as the second and third power FETs are turned on to prevent a shoot-through condition.

16. A power module as recited in claim 1, further comprising control logic for operating the synchronous rectifiers.

* * * * *